(No Model.) 2 Sheets—Sheet 1.

D. J. DAVIDSON.
SEPARATOR AND GRADER.

No. 521,402. Patented June 12, 1894.

WITNESSES
INVENTOR
David J. Davidson
By Merrill S. Wright,
His Attorney.

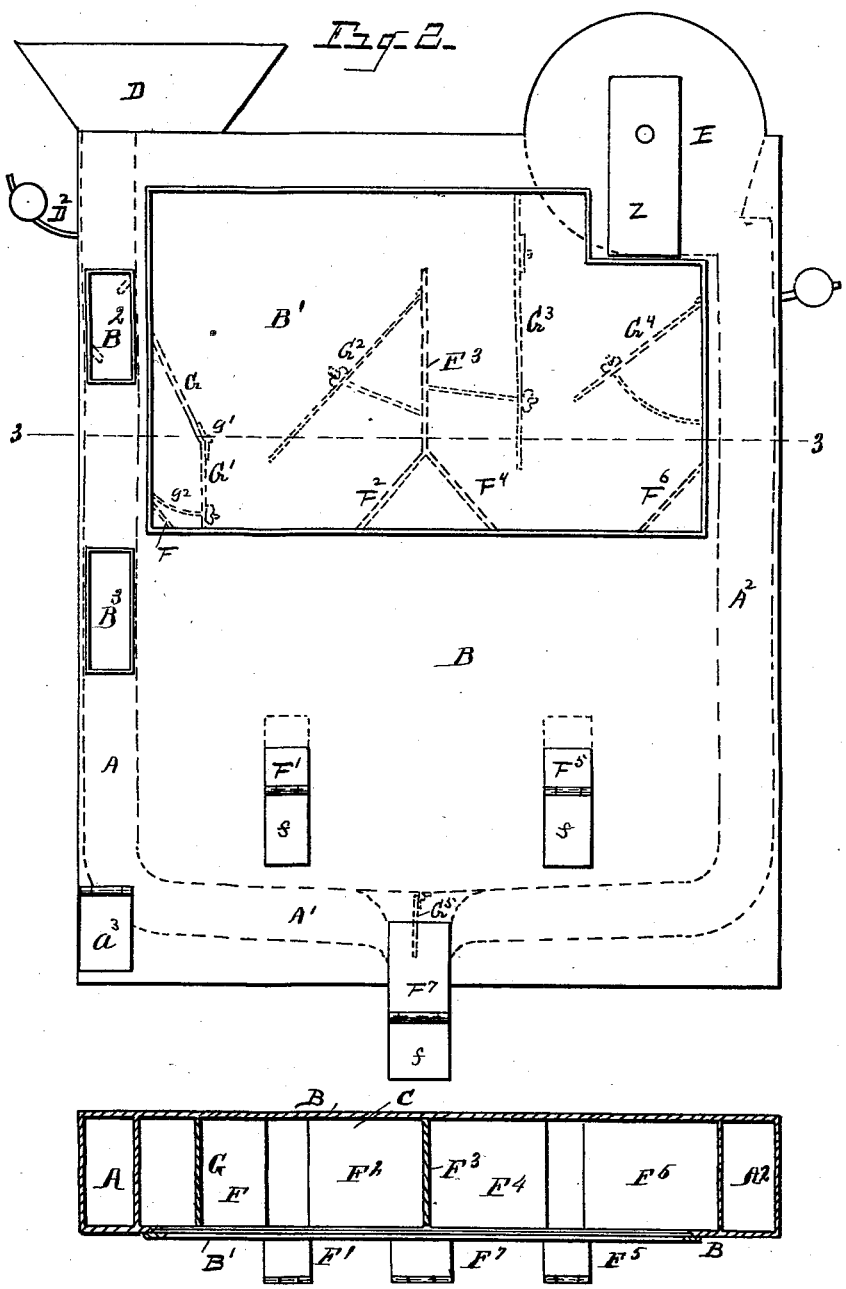

UNITED STATES PATENT OFFICE.

DAVID J. DAVIDSON, OF PORT HURON, MICHIGAN, ASSIGNOR OF TWO-THIRDS TO ABRAHAM S. MARTIN AND STEPHEN G. MARTIN, OF SAME PLACE.

SEPARATOR AND GRADER.

SPECIFICATION forming part of Letters Patent No. 521,402, dated June 12, 1894.

Application filed October 31, 1893. Serial No. 489,617. (No model.) Patented in Canada December 5, 1893, No. 44,823.

*To all whom it may concern:*

Be it known that I, DAVID J. DAVIDSON, a citizen of the United States, residing at Port Huron, county of St. Clair, State of Michigan, have invented a certain new and useful Improvement in Separators and Graders; (for which I have obtained a patent in Canada, dated December 5, 1893, No. 44,823;) and I declare the following to be a full, clear, and exact description of the invention, such as will enable others skilled in the art to which it appertains to make and use the same, reference being had to the accompanying drawings, which form a part of this specification.

My invention has for its object a purifier, separator, and grader to purify and grade any kind of grain, seed, flour middlings, or any other like commodity.

More particularly my invention is designed to provide an improved purifier, separator and grader, acting by gravity, in combination with a continuous air current, whereby the dust and other impurities, as well as the desired grades of grain or other commodities are suitably separated, collected, and deposited.

Reference is had to the accompanying drawings in which the same parts are indicated by the same letters throughout the several views.

Figure 1:
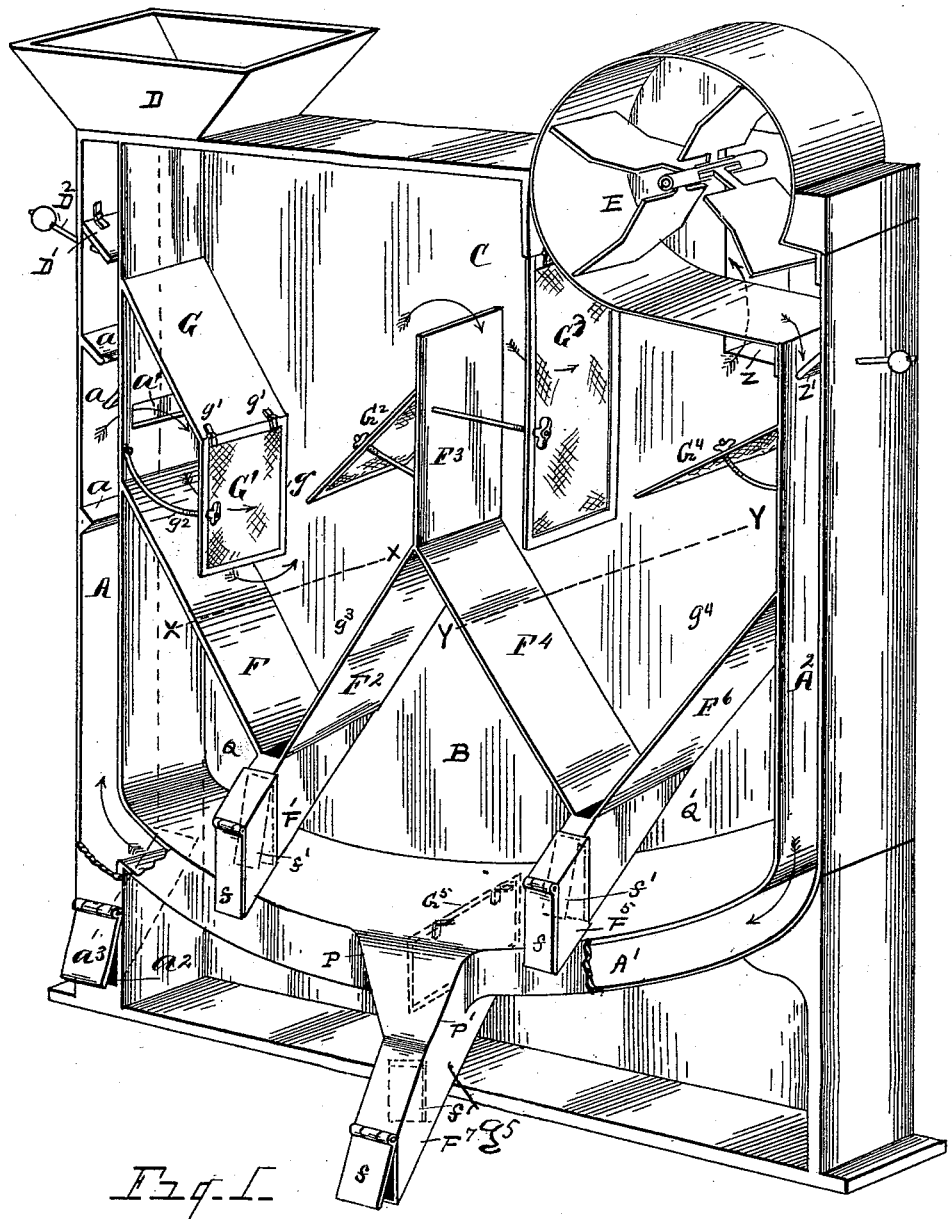
Figure 4:
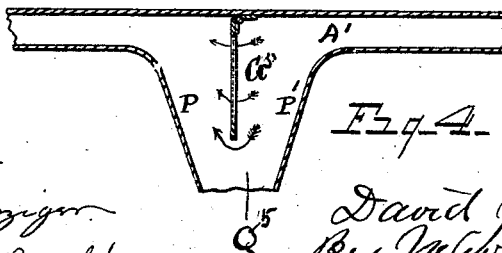

Figure 1 is a view of the interior mechanism in perspective, the case of the machine being removed, but showing the discharge ducts and their valves. Fig. 2 is a side elevation; and Fig. 3 is a horizontal section on the line 3 3 of Fig. 2. Fig. 4 is a vertical section through a portion of the trunk A' and the cant-boards and diaphragm connected therewith.

A, A' and A$^2$ are three trunks or tubes forming one continuous closed air passage, opening at one end into the fan chamber, and delivering air near the other end into the expansion chamber C bounded on either side by the inclosing case B. The trunk A is vertical and is provided with deflecting devices $a$ to deflect the grain falling from the hopper D toward the center of the said trunk and thus to allow the ascending air coming from the fan E to get between and around the individual grains, and also to break the velocity of the fall of the stock.

The hopper D is mounted over the upper end of the trunk A and delivers its stock into the said trunk by a valve D' preferably made self-closing as by means of the weighted arm D$^2$. As so constructed the weight upon said arm may be readily adjusted so as to effectually control the feed of the stock.

The base of the trunk A is provided with a delivery opening $a^2$ normally closed by a flap valve $a^3$ when not pressed outward by the weight of stock accumulated therein. This valve being situated out of the direct path of the air in the trunks A' and A there is a partial vacuum created there which of itself normally tends to keep the said valve closed. Any other means of keeping the said valve closed may be employed.

At some distance below the valve D' the trunk A is connected by an orifice $a'$ to the air or expansion chamber C, into which the air forced through the trunks A$^2$, A' and A expands and from which the air is exhausted by means of the fan E. A cant board F extends at an angle downward beneath the orifice $a'$ nearly meeting a similar cant board F$^2$, the space between the bottom of the said two cant boards opening into a discharge chute F' controlled by double flap valves $f$ and $f'$ so that the chute may be normally air tight and may open only one valve at a time when the weight of separated material accumulated in the chute is sufficient to press open first the upper valve and then passing this valve, which closes behind it, to then open the lower valve. Similar cant boards F$^4$ and F$^6$ unite in a second chute F$^5$ with valves similarly arranged. It will be seen that these cant boards form a W-shaped bottom to the air chamber in the base of which two V-shaped settling chambers $g^3$ and $g^4$ are formed. The spaces Q and Q' beneath the cant boards may be filled in or left open if desired. Above the junction of the cant boards F$^2$ and F$^4$ I provide a vertical partition F$^3$. Above the orifice A' and cant board F, I provide an inclined board G having hinged to its lower end a foraminous diaphragm G' made of flannel cloth, wire, or similar material, secured to a frame $g$ and adjusted to any desired distance from the cant board F by the bent screw threaded rod $g^2$ carrying a thumb nut on the end thereof.

A similar diaphragm G² is adjustably secured to the partition F³, and again other similar diaphragms G³ and G⁴ are adjustably mounted between the partition F³ and the rear wall of the chamber C. The chamber C opens into the fan chamber through the aperture Z.

The minimum cross section of the air passage, through the air trunks, and hence the quantity of air passing therethrough is controlled by the valve Z'.

The trunk A' is curved downward as shown, and at the lowest portion thereof another foraminous diaphragm G⁵ may be provided projecting downward into a discharge chute F⁷, with double valves similar to those already described. It will be noted that by the construction of the valves herein-described the machine is made practically air tight and no air carrying dust escapes therefrom.

The operation of the device is as follows:—
The stock is fed into the hopper D and falls through the valve D' on to the deflectors $a$ above the orifice A', being thus thrown well out into the middle of the air trunk A, the stock is in the best position to be acted upon by the air rushing upward and into the said orifice. In the part of the trunk A just below the orifice the greater mass of the lighter particles are blown upward and into the expansion chamber C; meantime the stock still falling throughout the length of the trunk A and kept by the deflectors $a$ clear of the sides and well in the center of the trunk is cleansed of all lighter particles and falls thoroughly cleaned into the chute $a^2$. The long distance through which the stock falls against the action of an ascending current of air is one of the essential features of the herein described machine. The air carrying the lighter solid particles with it enters the chamber C through the orifice $a'$ and passes downward partly through the diaphragm G' and partly beneath it; it then rises upward passing partly between the diaphragms G' and G², and partly through the latter diaphragm, and goes over the partition F³; thence it passes partly through the diaphragms G³ and G⁴ and partly between them through the aperture Z to the fan casing; and thence down through the trunk A² past the regulating valve Z' into the lower trunk A'; then partly passing through the diaphragm G⁵ and partly beneath it, it once more reaches the vertical trunk A', and the action is repeated.

It will be seen that after the air compressed by the fan into the air trunks passes through the orifice $a'$, it will expand in the larger chamber C and becoming lighter will drop its heavier particles, moreover the velocity of the air becoming less will also cause the said particles to fall out more readily. Thus the solid grains will be deposited in the chute $a^2$, the coarser and heavier separated matter in the chute F', the lighter and finer matter in the chute F⁵; and finally nearly all the dust carried through the fan will be separated in the V-shaped settling chamber P P'. This latter, however, is for most practical purposes a needless refinement and the diaphragm G⁵ and chute F⁷ may be omitted if desired. It will be seen that all the solid particles of any appreciable size fall out of the air before they reach the fan.

It will be seen that the base of the various V-shaped settling chambers is a place of little motion for the air or a dead air space (roughly represented in Fig. 1 by the space beneath the lines X X and Y Y) and that in these spaces the solid particles held in suspension by the motion of the air drop out and settle in the chutes below. It will also be evident that, by adjusting the position of the various diaphragms G' to G⁴, the relative quantity of air passing through the diaphragms and beneath or around them may be varied at will, and hence a greater or less screening of the solid particles contained in the air may be obtained. Moreover, by thus regulating the position of these various diaphragms the area of the various air passages and the velocity of the air passing therethrough may be varied at will. The quantity of air flowing through the entire machine may be regulated by means of the valve Z'.

It will be seen that a continuous belt of air is moving round and round through the machine and that this belt flows most rapidly past the valve Z' and in the narrow channel between the deflectors $a$ in the vertical trunk A, and most slowly in the expansion chamber C. The various separations are made by the dropping of the stock by its own gravity at the various separation points, on account of the diminution of air pressure at such points, as above described. By this means the stock is purified, separated and graded in the most efficient manner, the various separations being collected and discharged by themselves.

Glass panes B', B², and B³ are arranged in convenient positions for watching the operation of the machine.

What I claim is—

1. In a continuous air belt purifier, separator, and grader the combination with a fan and fan casing, of an air chamber connected with the fan casing and separating devices mounted therein, a vertical air trunk communicating with said air chamber, an air passage leading from the fan into said vertical air trunk separate from said air chamber, and a feeding device opening into the upper end of the vertical air trunk, substantially as and for the purposes described.

2. In a continuous air belt purifier, separator, and grader, the combination with a fan and fan casing, of an air chamber connected with the fan casing and separating devices mounted therein, a vertical air trunk communicating with said air chamber, an air passage leading from the fan into said vertical air trunk separate from said air chamber, means for controlling the pressure of the air in said passage, and a feeding device opening into the upper end of the vertical air trunk, chutes for withdrawing the settlings from said vertical trunk, and said settling chambers, and double valves controlling said chutes for making them air tight, substantially as described.

3. In a continuous air belt purifier, separator, and grader, the combination with a fan and fan casing, of an air chamber connected with the fan casing and separating devices mounted therein, a vertical air trunk communicating with said air chamber, an air passage leading from the fan into said vertical air trunk separate from said air chamber, means for controlling the pressure of the air in said air passage, an automatic feeding device at the top of said vertical trunk, and deflectors therein for directing the feed to the center of said trunk, substantially as and for the purposes described.

4. In a purifier, separator, and grader, the combination with a suitable casing, having vertical air trunks at its opposite ends, and a horizontal air trunk at its base connecting the lower ends of the said vertical air trunks, forming an air chamber in the central portion of the said casing and between and above the said air trunks, one of the said vertical trunks being connected with said air chamber, a grain feeding device located above the said air trunk and above the said connection, a fan casing connected with the upper end of the opposite vertical trunk and with the interior of the said air chamber, cant boards in the base of the said air chamber, diaphragms located above the said cant boards, and means for withdrawing the settlings from the said trunks and air chamber, substantially as described.

5. In a purifier, separator and grader, the combination with a suitable casing having vertical air trunks at its opposite ends, and a horizontal air trunk at its base, connecting the lower ends of the said vertical air trunks, forming a central air chamber in the central portion of the said casing and between and above the said trunks, one of the said vertical trunks being connected therewith, a grain feeding device located above the said air trunk and above the said connection, a fan casing connected with the upper end of the opposite vertical trunk, cant boards in the base of the said air chamber, adjustable foraminous diaphragms above the said cant boards, and means for withdrawing the settlings from the said trunks and air chambers, substantially as described.

6. In a purifier, separator and grader, the combination with a suitable casing, having vertical air trunks at its opposite ends, and a horizontal air trunk at its base, connecting the lower ends of the said vertical air trunks, forming a central air chamber in the central portion of the said casing and between and above the said air trunks, one of the said vertical trunks being connected therewith, a grain feeding device located above the said trunk and above its connection with the air chamber, a fan casing connected with the top of the opposite air trunk and with the top of the central air chamber, cant boards within the said casing between its connection with the said vertical trunk and the fan casing, a foraminous diaphragm above, the connection between the vertical air trunk and the chamber and above the first cant board, similar diaphragms above each of the successive cant boards, and means for discharging the contents of the said trunks and chambers, substantially as described.

7. In a purifier, separator, and grader, the combination with the casing B, the vertical air trunk A, provided with an aperture $a'$ near the top thereof, and deflectors $a$, a feed hopper above said aperture and mounted over said trunk, a fan and an air passage from said fan to said vertical air trunk, with means for controlling the air flowing through said passage a central air chamber connected with said air trunk and said fan, cant boards forming V-shaped settling chambers in said air chamber, foraminous diaphragms adjustably mounted in said air chamber and adapted to control the area of the air passages above said cant boards, and through said air chamber, and normally air tight delivery chutes at the base of said V-shaped settling chambers, substantially as and for the purposes described.

8. In a purifier, separator, and grader, the combination with the vertical trunk A provided with deflectors $a$ and orifice $a'$ near the top thereof, of the feed hopper D mounted above said vertical trunk and delivering its contents above said orifice, a normally air tight delivery chute at the base of said trunk, a fan and an air passage delivering air to said trunk, an expansion air chamber C connected to said fan by an aperture Z and to said trunk by the orifice $a'$, cant boards F, $F^2$, $F^4$ and $F^6$ forming V-shaped settling chambers in the base of said air chamber, normally air-tight chutes delivering the settlings from said chamber, a partition $F^3$ between the upper part of said settling chambers, deflectors G and foraminous diaphragms adjustably mounted in said chamber above said cant boards, so as to intercept all or part of the laden air current substantially as and for the purposes described.

In testimony whereof I sign this specification in the presence of two witnesses.

DAVID J. DAVIDSON.

Witnesses:
N. S. WRIGHT,
WALTER DENTON SMITH.